United States Patent
Vo et al.

(10) Patent No.: US 10,982,561 B2
(45) Date of Patent: Apr. 20, 2021

(54) INTEGRATED GAS TURBINE ENGINE SUPPORT AND SENSOR

(71) Applicant: United Technologies Corporation, Farmington, CT (US)

(72) Inventors: Tuan David Vo, Middletown, CT (US); George E. Allen, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 1054 days.

(21) Appl. No.: 15/030,128

(22) PCT Filed: Oct. 13, 2014

(86) PCT No.: PCT/US2014/060235
§ 371 (c)(1),
(2) Date: Apr. 18, 2016

(87) PCT Pub. No.: WO2015/057549
PCT Pub. Date: Apr. 23, 2015

(65) Prior Publication Data
US 2016/0265381 A1    Sep. 15, 2016

Related U.S. Application Data

(60) Provisional application No. 61/892,791, filed on Oct. 18, 2013.

(51) Int. Cl.
*F01D 21/00* (2006.01)
*G01K 1/14* (2021.01)
(Continued)

(52) U.S. Cl.
CPC ............ *F01D 21/003* (2013.01); *B64C 27/12* (2013.01); *F01D 5/02* (2013.01); *F01D 9/041* (2013.01);
(Continued)

(58) Field of Classification Search
CPC ...... F01D 21/003; F01D 17/085; F01D 25/24; F01D 25/28; F01D 5/02; F01D 9/041;
(Continued)

(56) References Cited

U.S. PATENT DOCUMENTS

| 4,037,473 A * | 7/1977 | Compton | G01J 5/0022 374/125 |
| 4,936,748 A * | 6/1990 | Adamson | F02C 6/206 416/123 |

(Continued)

FOREIGN PATENT DOCUMENTS

| DE | 102004016033 | 10/2005 |
| EP | 0385569 | 9/1990 |
| EP | 1553391 | 7/2005 |

OTHER PUBLICATIONS

International Preliminary Report on Patentability for Application No. PCT/US2014/060235 dated Apr. 28, 2016.
(Continued)

*Primary Examiner* — Richard A Edgar
*Assistant Examiner* — Aye S Htay
(74) *Attorney, Agent, or Firm* — Carlson, Gaskey & Olds, P.C.

(57) ABSTRACT

An example integrated support and sensor includes a longitudinal member to support an inner duct relative to an outer duct, and a sensor received within a bore of the longitudinal member and configured to collect a measurement from a flow path bounded by the inner duct.

23 Claims, 4 Drawing Sheets

(51) Int. Cl.

| | |
|---|---|
| *F01D 17/08* | (2006.01) |
| *G01K 13/02* | (2021.01) |
| *F01D 25/28* | (2006.01) |
| *B64C 27/12* | (2006.01) |
| *F01D 5/02* | (2006.01) |
| *F01D 9/04* | (2006.01) |
| *F01D 15/08* | (2006.01) |
| *F01D 25/24* | (2006.01) |
| *G01K 13/024* | (2021.01) |

(52) U.S. Cl.
CPC ............ *F01D 15/08* (2013.01); *F01D 17/085* (2013.01); *F01D 25/24* (2013.01); *F01D 25/28* (2013.01); *G01K 1/14* (2013.01); *G01K 13/02* (2013.01); *F05D 2220/323* (2013.01); *F05D 2220/329* (2013.01); *F05D 2270/303* (2013.01); *G01K 13/024* (2021.01)

(58) Field of Classification Search
CPC ............... B64C 27/12; F02D 2220/323; F02D 2220/329; F05D 2270/303
See application file for complete search history.

(56) References Cited

U.S. PATENT DOCUMENTS

| | | | | |
|---|---|---|---|---|
| 5,185,996 | A | * | 2/1993 | Smith ................ F01D 17/02 |
| | | | | 374/144 |
| 5,662,418 | A | * | 9/1997 | Deak ................ G01K 13/02 |
| | | | | 374/144 |
| 6,390,673 | B1 | * | 5/2002 | Camburn ............... G01K 1/08 |
| | | | | 374/138 |
| 7,111,982 | B1 | | 9/2006 | Swonger, Jr. |
| 7,153,023 | B2 | | 12/2006 | Howard et al. |
| 7,528,598 | B2 | | 5/2009 | Goldfine et al. |
| 7,922,441 | B2 | | 5/2011 | Shang et al. |
| 2005/0152433 | A1 | * | 7/2005 | Howard ................ G01K 1/14 |
| | | | | 374/208 |
| 2012/0107095 | A1 | * | 5/2012 | Juh ..................... F01D 5/027 |
| | | | | 415/119 |
| 2012/0110975 | A1 | | 5/2012 | Alholm |
| 2013/0011242 | A1 | | 1/2013 | Beeck et al. |
| 2013/0078080 | A1 | * | 3/2013 | Durocher ............ F01D 25/125 |
| | | | | 415/110 |
| 2013/0167554 | A1 | | 7/2013 | Parsons |

OTHER PUBLICATIONS

Supplementary European Search Report for Application No. 14853670.9 dated Feb. 17, 2017.
International Search Report and Written Opinion for PCT Application No. PCT/US2014/060235, dated Jan. 22, 015.

* cited by examiner

INTEGRATED GAS TURBINE ENGINE SUPPORT AND SENSOR

CROSS-REFERENCE TO RELATED APPLICATION

This application claims priority to U.S. Provisional Application No. 61/892,791 filed on Oct. 18, 2013.

BACKGROUND

This disclosure relates generally to gas turbine engine supports and, more particularly, to combining sensors with gas turbine engine supports.

A gas turbine engine typically includes a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor. The compressor section typically includes low and high pressure compressors, and the turbine section typically includes low and high pressure turbines. Typically, one of the turbines is a power turbine and drives a fan section or helicopter rotor. The power turbine may additional drive a compressor. Any remaining non-power turbines do not drive a fan section or helicopter rotor.

In some gas turbine engines, a speed reduction device, such as an epicyclical gear assembly, is utilized to drive the fan section such that the fan section may rotate at a speed different from, and typically slower than, the turbine section to increase the overall propulsive efficiency of the engine. In such engine architectures, a shaft driven by the power turbine provides an input to the epicyclical gear assembly that drives the fan section at a reduced speed so that both the power turbine and the fan section can rotate at closer to optimal speeds.

Gas turbine engines collect information using sensors. Sensors are used to, for example, measure flow path temperatures. A control system of the gas turbine engine collects the measurements. Supporting the sensors in appropriate positions within the gas turbine engine can require bulky assemblies that increase the overall weight of the gas turbine engine.

SUMMARY

An integrated support and sensor according to an exemplary aspect of the present disclosure includes, among other things, a longitudinal member to support an inner duct relative to an outer duct, and a sensor received within a bore of the longitudinal member. The sensor is configured to collect a measurement from a flow path bounded by the inner duct.

In a further non-limiting embodiment of the foregoing integrated assembly, a radially outer end of the longitudinal member is secured to the outer duct and a radially inner end of the longitudinal member constrains movement of the inner duct both axially and circumferentially.

In a further non-limiting embodiment of any of the foregoing assemblies, the assembly includes a sensor coupling member configured to be secured to the pin to position the sensor within the bore.

In a further non-limiting embodiment of any of the foregoing assemblies, the sensor includes a flange of the sensor. The flange contacts a radially outward end of the longitudinal member to limit radial inward movement of the sensor relative to the longitudinal member. Relative radial inward movement of the flange is limited by a radially outer end of the longitudinal member. Relative radial outward movement of the flange is limited by the coupling member.

In a further non-limiting embodiment of any of the foregoing assemblies, the assembly includes a flange of the longitudinal member to limit radial inward movement of the longitudinal member relative to the outer duct.

In a further non-limiting embodiment of any of the foregoing assemblies, the sensor extends into the flow path.

In a further non-limiting embodiment of any of the foregoing assemblies, the longitudinal member is threadably attached to the outer duct.

In a further non-limiting embodiment of any of the foregoing assemblies, the assembly includes a lock washer to limit threads of the sensor from disengaging from threads of the outer duct.

In a further non-limiting embodiment of any of the foregoing assemblies, the sensor comprises a temperature sensor.

In a further non-limiting embodiment of any of the foregoing assemblies, the wiring couples to the sensor exclusively at a radially outer end of the sensor.

In a further non-limiting embodiment of any of the foregoing assemblies, the sensor is configured to measure a temperature directly upstream from a power turbine of a gas turbine engine relative to a general direction of flow through the gas turbine engine.

In a further non-limiting embodiment of any of the foregoing assemblies, the inner duct is a mid-turbine frame of a gas turbine engine.

A gas turbine engine assembly according to another exemplary aspect of the present disclosure includes, among other things, an engine case, an intra-turbine duct received within the engine case, a longitudinal member extending across an annulus between the engine case and the intra-turbine duct. The longitudinal member at least partially supporting the intra-turbine duct relative to the engine case. A sensor is received within a bore of the longitudinal member to obtain a flow path measurement from a flow path radially inside the intra-turbine duct.

In a further non-limiting embodiment of the foregoing gas turbine engine assembly, the assembly includes a power turbine, the engine case, intra-turbine duct, and longitudinal member that are directly upstream from the power turbine.

In a further non-limiting embodiment of any of the foregoing gas turbine engine assemblies, the power turbine is configured to drive a fan of a gas turbine engine.

In a further non-limiting embodiment of any of the foregoing gas turbine engine assemblies, the power turbine is configured to drive a rotor of a helicopter.

In a further non-limiting embodiment of the foregoing gas turbine engine assembly, any remaining turbine stage in the gas turbine engine is upstream from the engine case, the intra-turbine duct, and the longitudinal member.

In a further non-limiting embodiment of any of the foregoing gas turbine engine assemblies, the assembly includes a plurality of mechanical bosses to support the intra-turbine duct relative to the engine case.

A method of mounting a sensor to obtain gas path measurements according to yet an exemplary aspect of the present disclosure includes, among other things, inserting a portion of a sensor within a bore of a longitudinal member. The longitudinal member supports an inner duct relative to an outer duct. The inner duct bounding the flow path.

In a further non-limiting embodiment of the foregoing method, the method includes measuring a temperature of the gas path using the sensor.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
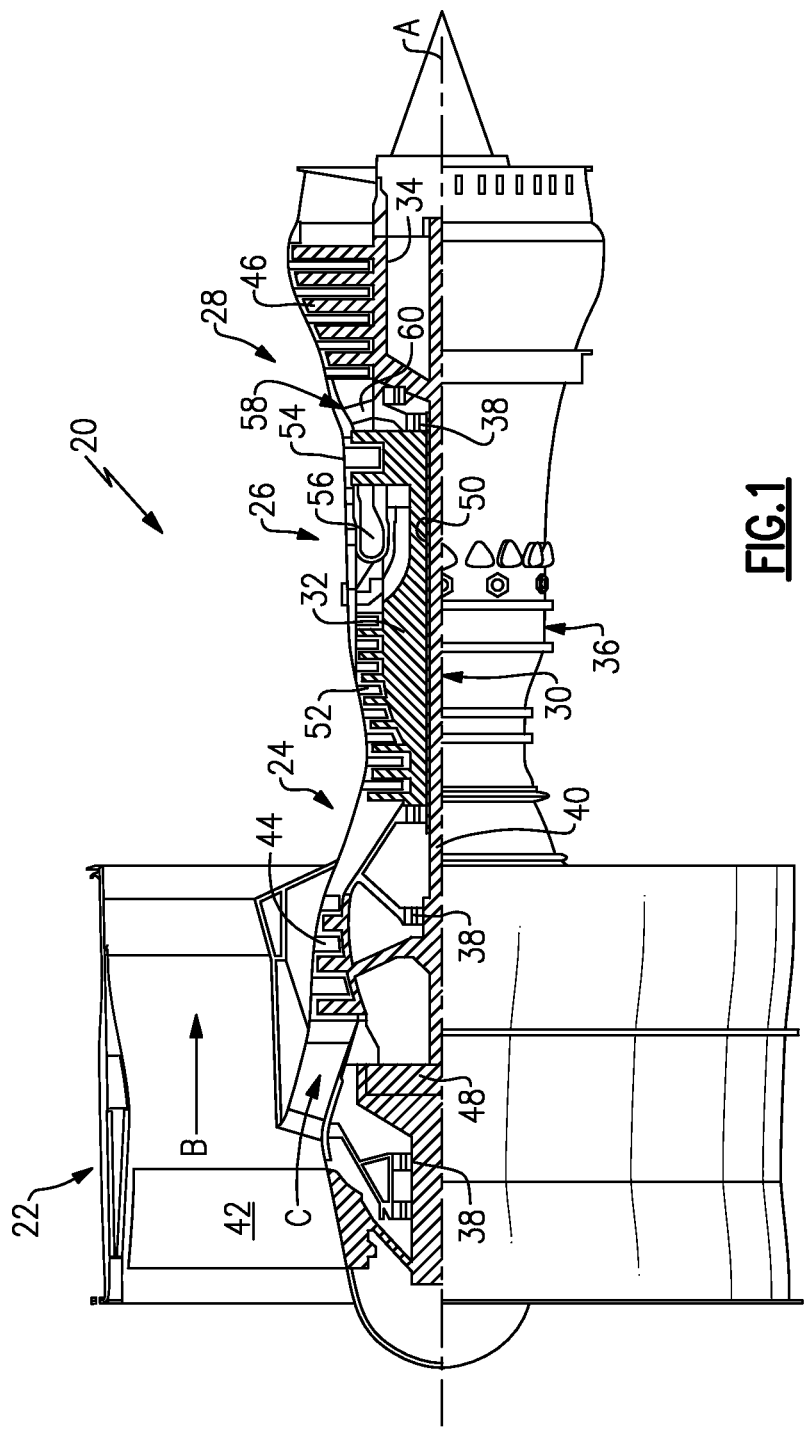
FIG. 1 schematically illustrates an example gas turbine engine.
Figure 2:
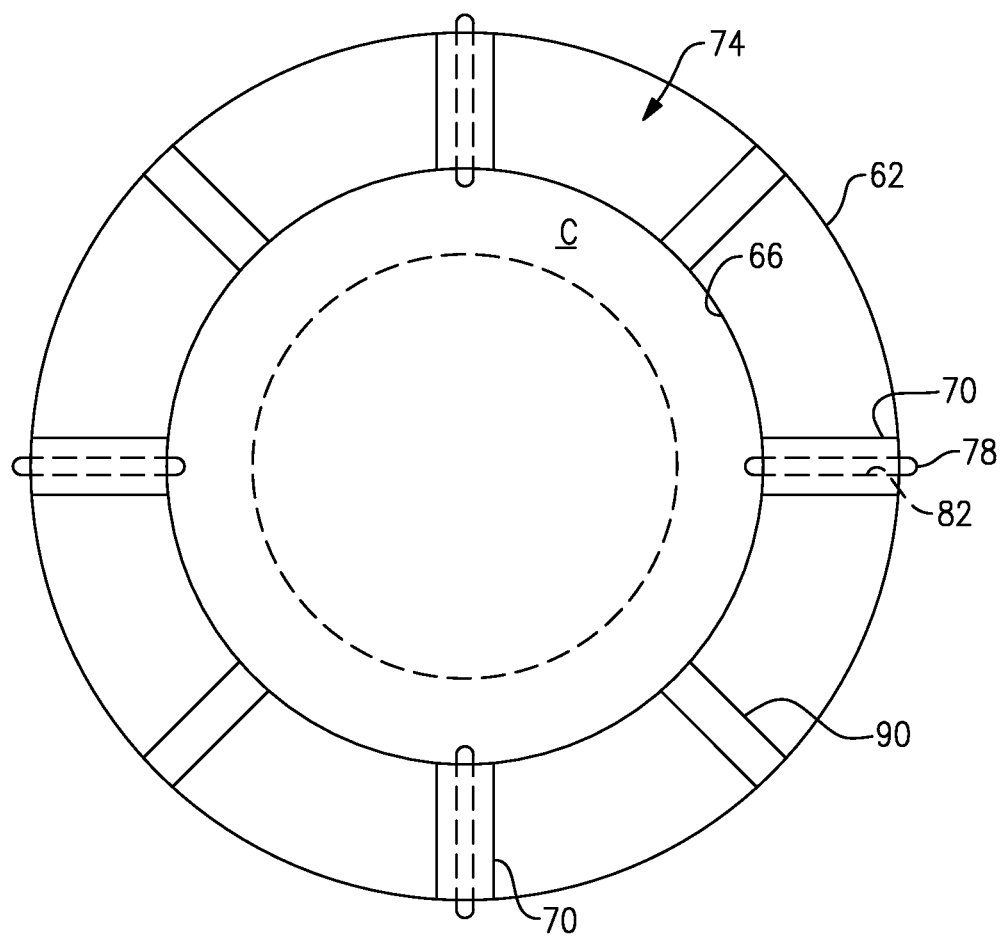
FIG. 2 shows a highly schematic view of an integrated support and sensor assembly securing an inner duct to an outer duct within the gas turbine engine of FIG. 1.

FIGS. 1 and 2 schematically illustrate an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 directly or through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow flowpath C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes stator vanes 60, which are in the core airflow path and function as an inlet guide vane for the low pressure turbine 46. Utilizing the stator vanes 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by air in the bypass flowpath B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(\text{Tram} \degree \text{R})/(518.7\degree \text{R})]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring now to FIG. 2 with continuing reference to FIG. 1, the engine 20 includes various components requiring support. In one example, such components include an outer duct 62 and an inner duct 66. The outer duct 62 supports the inner duct 66, which provides an outer boundary of the core flow path C through the engine 20.

A plurality of longitudinal members 70 extend radially from the outer duct 62 to the inner duct 66. The longitudinal members 70 extend across an annulus 74 radially between the outer duct 62 and the inner duct 66.

In this example, sensors 78 extend through bores 82 within the longitudinal members 70. The sensors 78 obtain measurements from the core flow path C, which is radially bounded by the inner duct 66. Example measurements include a temperature of flow moving within the core flow path C. Since the sensors 78 are received within the bores 82 of the longitudinal members 70, separate structures to support sensors 78 are not required.

In addition to the longitudinal members 70, bosses 90 extend across the annulus 74 from the outer duct 62 to the inner duct 66. Circumferentially distributed arrays of the longitudinal members 70 and the bosses 90 support the inner duct 66 relative to the outer duct 62. The total number of longitudinal members 70 and bosses 90 is from six to twelve in some examples.

The outer duct 62 is supported by, for example, mechanical fasteners (not shown) that secure the outer duct 62 to a stage of the engine directly upstream or downstream from the outer duct 62.

Figure 3:
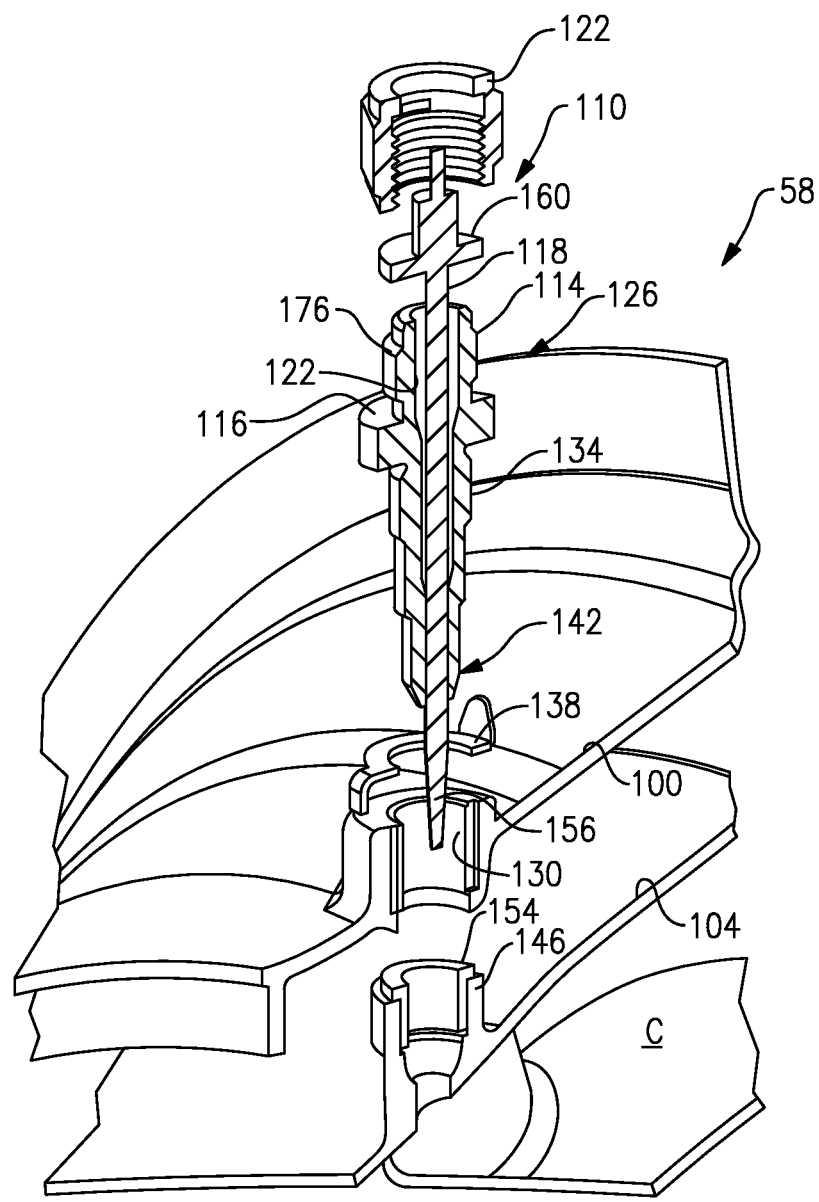
FIG. 3 shows a perspective exploded section view of an example inner duct and outer duct of FIG. 2.
Figure 4:
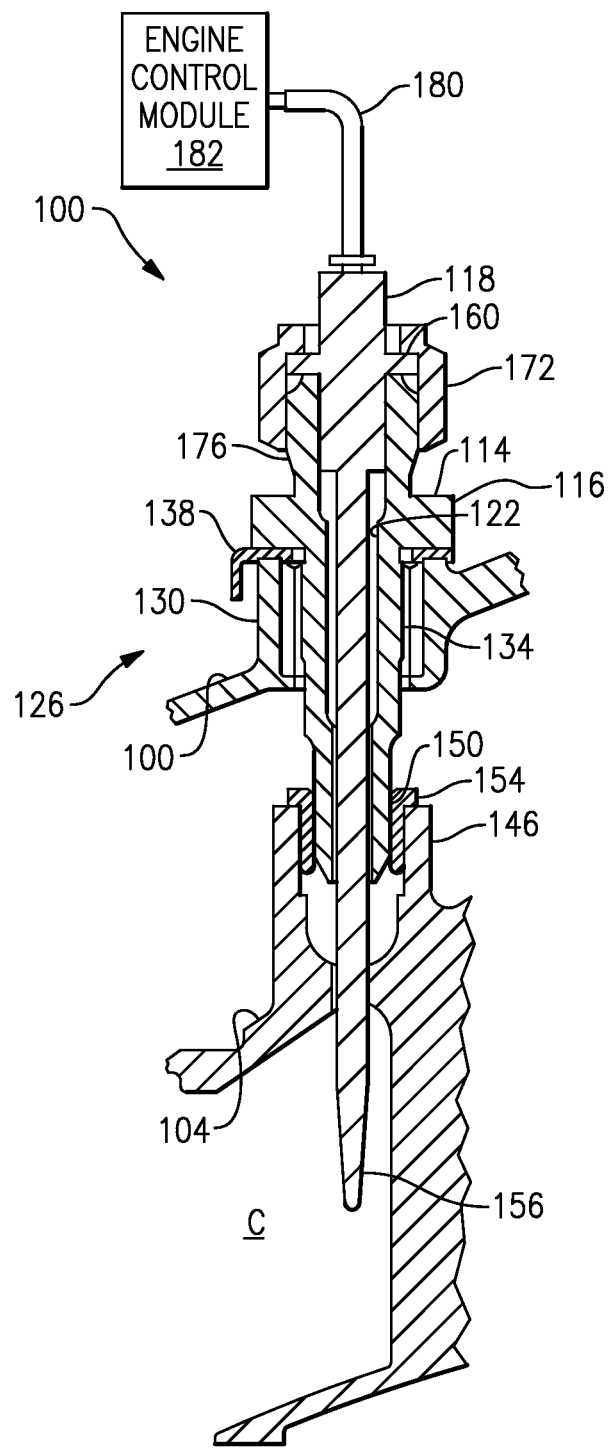
FIG. 4 shows a side view of the inner and outer ducts FIG. 3 in an assembled position.

Referring now to FIGS. 3 and 4 with continued reference to FIGS. 1 and 2, in some examples, the radially outer duct 62 is an engine case 100 and the radially inner duct 66 is an intra-turbine duct 104 (or fairing). The intra-turbine duct 104 is part of the mid-turbine frame 58 of the engine static structure 36. The mid-turbine frame 58 transfers bearing loads to the engine case 100 and directs core flow from the high pressure turbine 54 to the low pressure turbine 46.

An integrated support and sensor assembly 110 extends radially from the engine case 100 to the intra-turbine duct 104. The integrated support and sensor assembly 110 supports the intra-turbine duct 104 relative to the engine case 100.

The integrated support and sensor 110 includes a longitudinal member 114 and a sensor 118 received within a bore 122 of the longitudinal member 114. A radially outer end 126 of the longitudinal member 114 is secured to a boss 130 of the engine case 100. The radially outer end 126 includes a threaded area 134 to threadably secure the radially outer end 126 to the boss 130 of the engine case 100. A lock washer 138 may be used to prevent the threaded area 134 from loosening from the boss 130. The longitudinal member 114 can include a flange 116 to contact the engine case 100 or another structure to limit radial inward movement of the longitudinal member 114.

A radially inner end 142 of the longitudinal member 114 is secured to a boss 146 of the intra-turbine duct 104. The radially inner end 142 of the longitudinal member 114 can include an engagement area 150 received within the boss 146. In this example, a bushing 154 positioned within the boss 146 receives the radially inner end 142 and interfaces with the engagement area 150. The receipt of the radially inner end 142 positions the intra-turbine duct 104 circumferentially and axially with respect to the engine case 104 while permitting differences in thermal expansions.

The sensor 118 extends from a position radially outside the engine case 100 to a position radially inside the intra-turbine duct 104. A radially inner tip 156 of the sensor 118 extends into the core flow path C in this example to measure a temperature of the flow. The sensor 118 is a T45 probe sensor in this example that measures the gas generator exit total temperature within the core flow path C.

The sensor 118 includes a sensor flange 160 at the radially outboard end of the sensor 118. The flange 160 limits radially inward movement of the sensor 118. In this example, the flange 160 contacts the longitudinal member 114 to limit relative radial inward movement of the sensor 118.

A sensor coupling member 172 secures to a head 176 at the radial outer end 126 of the longitudinal member 114. The flange 160 is captured between the coupling member 172 and the longitudinal member 114. The coupling member 172 limits radial outward movement of the sensor assembly 118 from the longitudinal member 114. In this example, the flange 160 contacts the longitudinal member 114 to limit relative radial outward movement of the sensor 118.

The example sensor coupling member 172 is threadably secured to the head 176. In another example, the sensor coupling member 172 could press fit onto the head 176.

Wires 180 couple the sensor 118 to a remaining portion of the engine 20, such as an engine control module 182. The wires 180 are at the radially outer end 126. Measurements are detected by the sensor 118 at the radially inner tip 156.

As the sensor 118 collects measurements from the core flow path C, these measurements are communicated back to the engine control module 182, which uses the measurements to monitor power, for example, generated by the engine 20.

Although the sensor 118 measures air temperatures at the core flow path C in this example, other sensors supported in other areas of the engine 20 can be utilized. The other sensors are capable of measuring various flowpath parameters of interest, such as temperature and pressure. The other sensors can collect information about total pressure, static pressure, Mach number, swirl angle, etc.

The engine case 100 and the intra-turbine duct 104 are directly upstream from the low pressure turbine 46. Since the low pressure turbine is rotated to drive the fan section 22, the low pressure turbine 46 is considered a power turbine (or free-output turbine) of the engine 20. The high pressure turbine 54 is not a power turbine as the high pressure turbine is not utilized to drive the fan section 22. In other examples, such as turboshaft engines, a power turbine may be utilized to drive a helicopter rotor. Any remaining turbines in such the turboshaft engine would be utilized to drive compressors and would not drive the helicopter rotor.

The example integrated support and sensor 110 is thus directly upstream from the power turbine of the engine 20. Directly upstream, in this example, means that there are no turbine stages between the integrated support and sensor 118 and the power turbine, which is the low pressure turbine 46 in this example.

Features of the disclosed examples include eliminating sensor supporting structures by eliminating structures that supported sensors exclusively. The sensors are not supported utilizing components that also function to support inner ducts relative to outer ducts.

The disclosed examples allow some mechanical supporting components formerly utilized exclusively to support inner ducts relative to outer ducts to be eliminated. The disclosed examples also provide design flexibility. In one example, up to seven mechanical supporting components are eliminated by housing the sensors with bosses. The integrated support and sensor of the disclosed examples supports both the inner duct and the sensor.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An integrated support and sensor assembly, comprising:
    a longitudinal member to support an inner duct relative to an outer duct, wherein the longitudinal member is threadably attached to the our duct; and
    a sensor received within a bore of the longitudinal member and configured to collect a measurement from a flow path bounded by the inner duct, wherein a radially outer end of the longitudinal member defining the bore is fixedly attached to the outer duct; and
    a lock washer to limit threads of the sensor from disengaging from threads of the outer duct.

2. The integrated support and sensor assembly of claim 1, wherein a radially inner end of the longitudinal member constrains movement of the inner duct both axially and circumferentially.

3. The integrated support and sensor assembly of claim 2, further comprising a sensor coupling member configured to be secured to the longitudinal member to position the sensor within the bore.

4. The integrated support and sensor assembly of claim 3, further comprising a flange of the sensor, the flange contacting the radially outer end of the longitudinal member to limit radial inward movement of the sensor relative to the longitudinal member, wherein relative radial inward movement of the flange is limited by the radially outer end of the longitudinal member, and wherein relative radial outward movement of the flange is limited by the sensor coupling member.

5. The integrated support and sensor assembly of claim 1, further comprising a flange of the longitudinal member to limit radial inward movement of the longitudinal member relative to the outer duct.

6. The integrated support and sensor assembly of claim 1, wherein the sensor extends into the flow path.

7. The integrated support and sensor assembly of claim 1, wherein the sensor comprises a temperature sensor.

8. The integrated support and sensor assembly of claim 1, wherein wiring couples to the sensor exclusively at a radially outer end of the sensor.

9. The integrated support and sensor assembly of claim 1, wherein the sensor is configured to measure a temperature directly upstream from a power turbine of a gas turbine engine relative to a general direction of flow through the gas turbine engine.

10. The integrated support and sensor assembly of claim 1, wherein the inner duct is a mid-turbine frame of a gas turbine engine.

11. A gas turbine engine assembly, comprising:
    an engine case;
    an intra-turbine duct received within the engine case and at least partially defining a mid-turbine frame with the engine case;
    a longitudinal member extending across an annulus between the engine case and the intra-turbine duct, the longitudinal member at least partially supporting the intra-turbine duct relative to the engine case, wherein a radially outer end of the longitudinal member is fixedly attached to the engine case and a radially inner end of the longitudinal member is fixed relative to the radially outer end; and
    a sensor received within a bore of the longitudinal member to obtain a flow path measurement from a flow path radially inside the intra-turbine duct.

12. The gas turbine engine assembly of claim 11, further comprising a power turbine and a high pressure turbine, wherein the engine case, the intra-turbine duct, and the longitudinal member are located directly downstream of the high pressure turbine and directly upstream from the power turbine.

13. The gas turbine engine assembly of claim 12, wherein the power turbine is configured to drive a fan of a gas turbine engine.

14. The gas turbine engine assembly of claim 12, wherein the power turbine is configured to drive a rotor.

15. The gas turbine engine assembly of claim 12, wherein any remaining turbine stage in the gas turbine engine is upstream from the engine case, the intra-turbine duct, and the longitudinal member and a distal end of the sensor extends radially inward beyond a distal end of the longitudinal member and into the flow path radially inside the intra-turbine duct.

16. The gas turbine engine assembly of claim 11, further comprising a plurality of mechanical bosses to support the intra-turbine duct relative to the engine case, wherein the plurality of mechanical bosses are circumferentially spaced from the sensor.

17. The gas turbine engine assembly of claim 11, wherein the radially outer end of the longitudinal member is threadably attached to the engine case, and the radially inner end of the longitudinal member constrains movement of the intra-turbine duct both axially and circumferentially.

18. The gas turbine engine assembly of claim 11, wherein the longitudinal member is threadably attached to an outer duct and a lock washer to limit threads of the sensor from disengaging from threads of the outer duct.

19. A method of mounting a sensor to obtain gas path measurements, comprises:
    inserting a portion of a sensor within a bore of a longitudinal member, the longitudinal member supporting an inner duct relative to an outer duct, the inner duct bounding the flow path; and wherein a radially outer end of the longitudinal member is fixedly attached to the outer duct and a radially inner end of the longitudinal member is fixed relative to the radially outer end and the inner duct and the outer duct at least partially define a mid-turbine frame separating a power turbine from a high speed turbine.

20. The method of claim 19, including measuring a temperature of the gas path using the sensor, wherein a distal end of the sensor extends radially inward beyond a distal end of the longitudinal member and into the flow path radially inside the inner duct.

21. A gas turbine engine assembly comprising:
an engine case;
an intra-turbine duct received within the engine case and at least partially defining a mid-turbine frame with the engine case;
a longitudinal member extending across an annulus between the engine case and the intra-turbine duct, the longitudinal member at least partially supporting the intra-turbine duct relative to the engine case, wherein a radially outer end of the longitudinal member is fixedly attached to the engine case;
a sensor received within a bore of the longitudinal member to obtain a flow path measurement from a flow path radially inside the intra-turbine duct; and
a mid-turbine frame arranged between a first turbine and a second turbine, wherein the mid-turbine frame supports a bearing system, the mid-turbine frame includes stator vanes in the flow path that set airflow entering the second turbine, and the intra-turbine duct is a portion of the mid-turbine frame.

22. The gas turbine engine assembly of claim 21, further comprising:
a sensor coupling member threadably secured to the longitudinal member to position the sensor within the bore;
wherein the longitudinal member includes an elongated body that extends between a radially inner end and the radially outer end, and the elongated body is directly exposed in the annulus;
wherein the sensor includes a sensor flange contacting the radially outer end of the longitudinal member to limit radial inward movement of the sensor relative to the longitudinal member, and the sensor flange is captured between the sensor coupling member and the longitudinal member such that relative radial outward movement of the sensor flange is limited by the sensor coupling member and a distal end of the sensor extends radially inward a distal end of the longitudinal member and into the flow path radially inside the intra-turbine duct; and
a plurality of mechanical bosses to support the intra-turbine duct relative to the engine case, wherein the plurality of mechanical bosses are circumferentially spaced from the sensor.

23. The gas turbine engine assembly of claim 21, wherein the longitudinal member is threadably attached to an outer duct and a lock washer to limit threads of the sensor from disengaging from threads of the outer duct.

\* \* \* \* \*

UNITED STATES PATENT AND TRADEMARK OFFICE
CERTIFICATE OF CORRECTION

PATENT NO.        : 10,982,561 B2
APPLICATION NO.   : 15/030128
DATED             : April 20, 2021
INVENTOR(S)       : Tuan David Vo and George E. Allen It is certified that error appears in the above-identified patent and that said Letters Patent is hereby corrected as shown below:

In the Claims

In Claim 1, Column 7, Line 37; replace "our duct" with --outer duct--

Signed and Sealed this
Twenty-sixth Day of April, 2022

Katherine Kelly Vidal
*Director of the United States Patent and Trademark Office*